US007286523B2

(12) United States Patent
Mercuriali et al.

(10) Patent No.: US 7,286,523 B2
(45) Date of Patent: Oct. 23, 2007

(54) TERMINAL SUPERVISING DEVICE

(75) Inventors: Jean-Pierre Mercuriali, Orsay (FR); Pierre Labaume, Montigny-le-Bretonneux (FR)

(73) Assignee: Eads Defence and Security Networks, Montigny-le-Bretonneux (FR)

( * ) Notice: Subject to any disclaimer, the term of this patent is extended or adjusted under 35 U.S.C. 154(b) by 992 days.

(21) Appl. No.: 10/275,090

(22) PCT Filed: May 2, 2001

(86) PCT No.: PCT/FR01/01339

§ 371 (c)(1),
(2), (4) Date: Nov. 1, 2002

(87) PCT Pub. No.: WO01/86969

PCT Pub. Date: Nov. 15, 2001

(65) Prior Publication Data

US 2003/0103493 A1    Jun. 5, 2003

(30) Foreign Application Priority Data

May 5, 2000   (FR)   ................................. 00 05824

(51) Int. Cl.
*H04L 12/66* (2006.01)
(52) U.S. Cl. ..................................................... 370/352
(58) Field of Classification Search ................ 370/351, 370/352, 260, 465, 401; 709/213, 209
See application file for complete search history.

(56) References Cited

U.S. PATENT DOCUMENTS 5,774,668 A * 6/1998 Choquier et al. ........... 709/223

FOREIGN PATENT DOCUMENTS

WO    WO97/31491    8/1997

OTHER PUBLICATIONS

Petrou C et al., "An XML-based, 3-tier Scheme for Integrating Heterogenous Information Sources to the WWW", Proceedings of the IEEE 10th International Workshop on Database and Expert Systems Applications, 1999, pp. 706-710.
Takeuchi R et al., "Interfaces for Interworking among Intelligent Networks Computer Telephony, and Voice and IP Systems", GLOBECOM. IEEE Global Telecommunications Conference and Exhibition, New York, NY, US, vol. 1999, pp. 1916-1920.
International Search Report, Appln. No. PCT/FR01/01339, Dated Aug. 28, 2001.

* cited by examiner

*Primary Examiner*—Wing Chan
*Assistant Examiner*—Lawrence Burrowes
(74) *Attorney, Agent, or Firm*—McCracken & Frank LLP (57) ABSTRACT

A proxy server is used to provide various services managed by a plurality of dedicated servers to subscribers using terminals connected to a communication network. The proxy device has a three-tier type of architecture, with a stage for presenting services to terminals through the network, a service multiplexing stage communicating with the presentation stage, and a service access stage communicating with the multiplexing stage and including a plurality of access modules each associated with a respective dedicated server. The various services managed by the dedicated servers are multiplexed by the central stage which holds sessions with the subscribers without requiring a particular awareness of the services managed by the dedicated servers, nor of the physical features of the terminals.

11 Claims, 3 Drawing Sheets

TERMINAL SUPERVISING DEVICE

This application is the US national phase of international application PCT/FR01/01339 filed 2 May 2001 which designated the US.

BACKGROUND OF THE INVENTION

The present invention relates to the field of company communications, and more especially to company communications systems offering diversified services, of multimedia type for example.

The development of company telecommunication has taken two routes: circuit switching telephony networks and packet switching computer networks.

The architecture of private telephony networks has traditionally been organized around a switching system comprising one or more automatic exchanges or PABX ("Private Automatic Branch eXchange") connected to a collection of telephone terminals. The deployment of telephone services is implemented by means of signaling information exchanged between a call server, made up of one or more entities of the switching system, the PABX or PABXs and the telephone terminals. A family of communication protocols generally supporting several telephony services is necessary for establishing such exchanges. The ISDN ("Integrated Services Digital Network") protocols provide such an example of a family of protocols.

The development of new services has led to the incorporation of additional servers into communication systems, these servers being dedicated to these new services (for example voice messaging server, directory server, etc.). The signaling protocols initially designed for call processing functions, for example the H.323 protocol standardized by the International Telecommunications Union, have naturally evolved toward integration of new services.

Other signaling protocols, specific to particular services have been developed, such as for example the DAP ("Directory Access Protocol") and LDAP ("Lightweight Directory Access Protocol") protocols specific to the directory services, the SMTP ("Simple Mail Transfer Protocol") and IMAP ("Internet Message Access Protocol") protocols specific to messaging, or the HTTP ("HyperText Transfer Protocol") protocol specific to web browsing, etc. These protocols are customarily used only for the deployment of the corresponding services within data transmission computer networks. Their interoperation with telephony type signaling protocols requires that servers of different kind should be capable of communicating with one another, that is to say that some at least of the servers should be aware of the "jobs" of the other servers. This results in great complexity of the protocols as well as a lack of flexibility when one wishes to upgrade the functions offered.

Moreover, the use of multiple servers dedicated to different jobs often leads the subscribers to carry on a dialog successively with several servers to accomplish a given function, thereby affecting the efficiency and ergonomics of the system.

Within the framework of the web service, it is known to process user requests by interrogating heterogeneous information sources, to translate the various responses and to group them into a data page of a tagging language such as HTML ("HyerText Markup Language") or XML ("eXtended Markup Language"), which is returned to the user's web browser software. This can be carried out by means of architectures of the three-tier type, as described in the article by C. Petrou et al. "An XML-based, 3-tier Scheme for Integrating Heterogeneous Information Sources to the WWW", Proc. of the IEEE $10^{th}$ International Workshop on Database and Expert Systems Applications, 1999, pages 706-710. This makes it possible to process user requests individually, but not to present thereto diversified services to which same has access.

A primary object of the invention is to make the architectures of communication networks more flexible, in the sense that they readily allow the integration of new services or the modification of existing services, by circumventing the specific nature of the interfaces with the servers of various jobs while offering the subscribers considerable functional richness.

SUMMARY OF THE INVENTION

The invention thus proposes a device for supervising terminals which to a communication network for supplying subscribers using the terminals with various services managed by a plurality of dedicated servers, the device comprising means of interfacing with the network, a stage for presenting services to the terminals through said interfacing means, a service multiplexing stage communicating with the presentation stage, and a service access stage communicating with the multiplexing stage and comprising a plurality of access modules each associated with a respective dedicated server. Each access module is arranged to deliver tagged data pages to the multiplexing stage in response to incoming messages from the associated dedicated server and/or to page requests from the multiplexing stage, and to deliver merge data to the multiplexing stage in response to merge requests, each delivered page being associated with a subscriber with which the multiplexing stage has a communication session in progress through the presentation stage, whereby some at least of the pages delivered to the multiplexing stage contain merge codes pertaining to services. The multiplexing stage comprises means for processing each page received from the access stage so as to detect the merge codes, address a merge request to the access module associated with the dedicated server managing the service to which each detected merge code pertains, substitute the merge data delivered by said access module in response to the merge request for a field of the page including the detected merge code, and supply the processed page to the presentation stage within the framework of the session in progress with the associated subscriber. Each page supplied to the presentation stage contains tagged data describing, according to a format independent of the terminals, elements of interaction with the associated subscriber. The presentation stage comprises terminal control means for interpreting each page received from the multiplexing stage within the framework of a session in progress with a subscriber using one of the terminals so as to generate commands adapted to the presentation on the terminal of interaction elements described by the tagged data of the page. The multiplexing stage further comprises routing means for receiving page addresses from the presentation stage within the framework of a session in progress with a subscriber, identifying an access module for which the page address received is intended and transmitting a corresponding page request to the identified access module.

The device has a three-tier type of architecture, and acts as a "proxy" agent in relation to the terminals for the various services managed by the dedicated servers. These services are multiplexed by the central stage which holds sessions with subscribers without having any particular awareness with regard to the services managed by the dedicated servers or with regard to the physical features of the terminals.

The multiplexing stage combines elements pertaining to various jobs in the data which are supplied for the presentation of the services to the subscribers. To do this, it simply associates determined merge codes with access modules to which it addresses the requests making it possible to supplement the pages previously received. It is these access modules which, in a stand alone manner or in conjunction with associated dedicated servers, incorporate an awareness of the corresponding jobs to supply the data required by the multiplexing stage.

It is therefore relatively easy to enhance or upgrade the system. The addition or the substitution of new dedicated servers functioning according to specific protocols does not involve any reassessment of the protocols used elsewhere in the system.

In a preferred embodiment of the device, the tagged data contained in some at least of the pages supplied to the presentation stage describe, in addition to the elements of interaction with the associated subscriber, at least one link between one of said interaction elements and a page address. The terminal control means of the presentation stage are then arranged to associate each link of a page received from the multiplexing stage within the framework of a session in progress with a subscriber using one of the terminals with an event which may occur at the terminal, and to return the page address of said link to the multiplexing stage within the framework of said session in response to an occurrence of said event.

DESCRIPTION OF PREFERRED EMBODIMENTS

In the exemplary embodiment described hereinbelow, terminal equipment of different types have access, through a company communication network and of a device according to the invention, to the following diversified services: telephony, logging of calls, directory, unified messaging (i.e. voice or electronic messaging), web browsing on an Internet or Intranet network, these services being provided by a collection of dedicated servers connected to the network.

Figure 1:
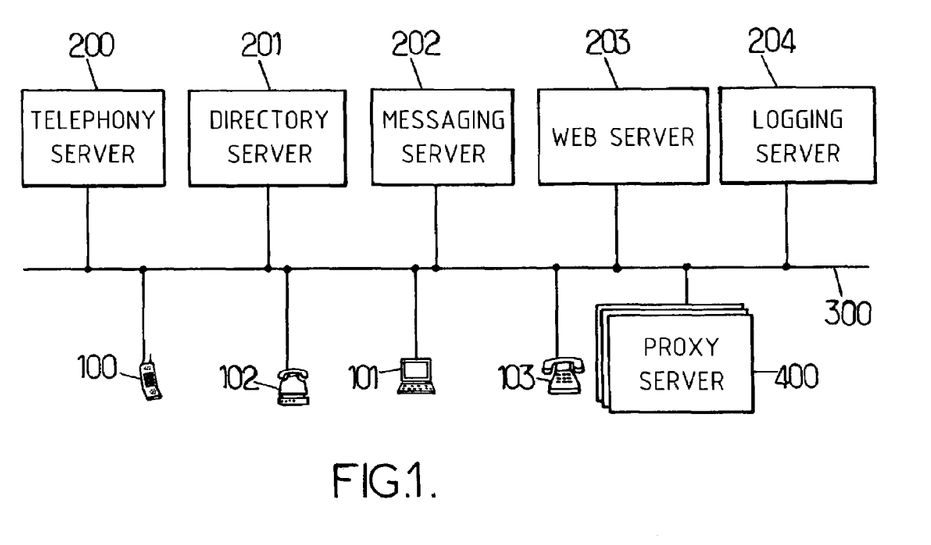
FIG. 1 is a diagram illustrating an exemplary telecommunication network integrating a device according to the invention.

FIG. 1 shows the terminals of various types (for example mobile set 100, microcomputer 101, ISDN set fitted with an IP adapter 102, IP native set 103) which are linked to a packet mode communication network 300 operating according to the IP ("Internal Protocol") protocol. The network 300 can be a local area network (LAN) with which an organization is equipped so as to supply services for transmitting data to the users of the terminals 100-103. It consists for example of a plurality of subnetworks of Ethernet type between which the switching of the IP packets is performed in a conventional manner by routers (not represented).

Several servers, dedicated to the relevant services, are further connected to the LAN 300: a telephony server 200, a directory server 201, a unified messaging server 202, a web browser server 203, as well as a server for logging telephone calls 204.

A device according to the invention 400, a so-called "proxy server", is also linked to the LAN 300. This device fulfills a proxy function, that is to say that, to access the services managed by the dedicated servers 200-204 of the network 300, the terminals 100-103 can open a session only with the device 400. Moreover, the incoming signaling relating to these services can be addressed to the terminals only through the device 400.

Of course, it is possible for some of the servers 200-204, 400 to be embodied within a common platform. For example, the telephony and logging servers 200, 204 will frequently be in the same item of network equipment. The proxy server 400 may also be in the same item of equipment as one of the dedicated servers, for example the telephony server 200.

Figure 2:
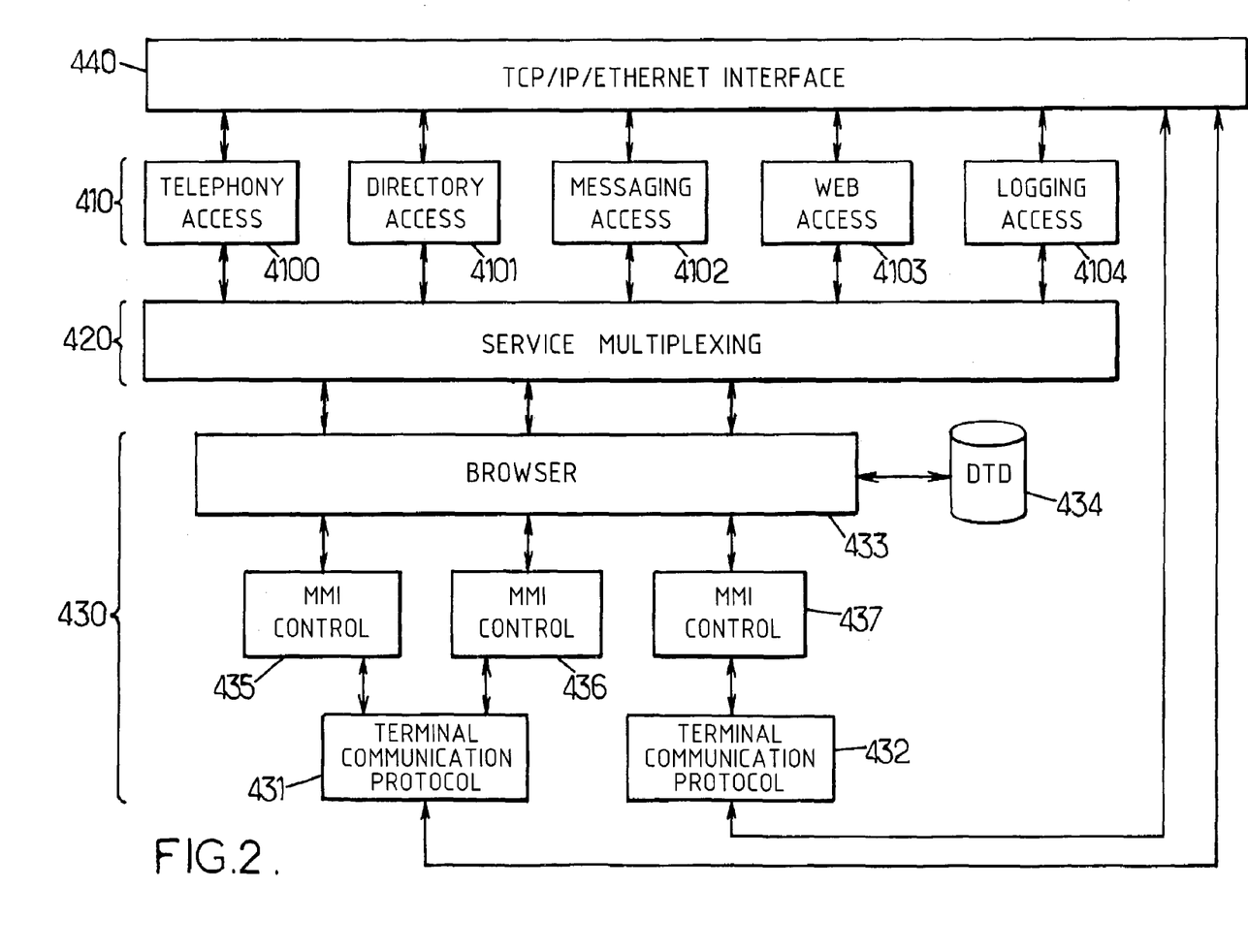
FIG. 2 is a general diagram of a device according to the invention.

The proxy server 400 has an architecture of three-tier type, of which FIG. 2 shows the three stages: service access stage 410, service multiplexing stage 420 and service presentation stage 430.

The access stage 410 (job entity) groups together all the processing specific to the various services managed by the dedicated servers 200-204. It effects the interfacing of the proxy server 400 with the various dedicated servers 200-204, and exchanges data originating from and destined for the service entity 420 according to a unified format.

The stage 410 comprises access modules 4100-4104 respectively associated with the dedicated servers 200-204 with which they are capable of carrying on a dialog. Each access module 4100-4104 performs the processing relating to the supplying of a service by the associated dedicated server 200-204 to the users of the network integrating the proxy server 400. Thus is found, in the example considered, an access module 4100 associated with the dedicated telephony server 200, an access module 4101 associated with the dedicated directory server 201, an access module 4102 associated with the dedicated messaging server 202, an access module 4103 associated with the dedicated browsing server 203 and an access module 4104 associated with the dedicated server for logging calls 204.

In an embodiment of the invention, each access module 4100-4104 manages a connection to the application level of the OSI model with its associated dedicated server 200-204. The structure of the data exchanged and the exchange protocol for these data depend on the service concerned (for example H.323 for telephony, LDAP for the directory service, IMAP4 for electronic messaging, HTTP for browsing, etc.).

In another embodiment, some or all of the dedicated servers 200-204 talk directly to the corresponding access modules 4100-4104 according to a connection of a transport level protocol, typically TCP ("Transmission Control Protocol"), and exchange tagged data pages supplying semantic descriptions of elements according to the XML language ("eXtended Markup Language"). Versions of XML, whose document type descriptions (DTD) have been developed for adaptation to various jobs, can thus be used for the exchanges between the proxy server 400 and the servers of the corresponding jobs.

The multiplexing stage 420 (service entity) carries out the interaction between the various services managed by the dedicated servers 200-204, routes the requests originating from the presentation stage 430 toward the modules of the access stage 410, and sends the data originating from the access stage 410 to the presentation stage. It moreover administers the sessions opened with the various terminals managed by the proxy server 400. The processing performed by the stage 420 does not allow for any awareness of the services whose information it relays, or of the characteristics of the terminals connected to the network 300.

The presentation stage 430 (presentation entity) contains the collection of means of connection and of dialog with the various types of terminals compatible with the proxy server 400, and fulfills the function of presenting the data received from the multiplexing stage 420 to the terminal from which the subscriber who is the recipient of the data has opened a session with the proxy server 400. According to their characteristics, the terminals 100-103 can be arranged to communicate according to various types of communication protocols. For each of these protocols, the presentation stage 430 comprises an interface module 431, 432 which organizes the transmission and reception of the corresponding messages.

The access modules 4100-4104 and the terminal interfacing modules 431, 432 of the presentation stage are connected to a module 440 for interfacing with the LAN 300 which accomplishes the functions of layers 1 to 4 of the OSI model. In the example considered, the module 440 manages the exchanges of the proxy server 400 according to the TCP, IP and Ethernet protocols. Of course, if the proxy server 400 is incorporated into the same item of equipment as one of the dedicated servers 200-204, the corresponding access module will be able to talk directly to this dedicated server without going through the interface module 440.

The access stage 410 generates tagged data pages, i.e. collections of descriptions of elements whose syntax is common to the collection of access modules 4100-4104, which it sends to the multiplexing stage. In a preferred embodiment of the invention, data description pages structured in the XML sense are used. Alternatively, it would be possible to use objects of COM type ("Component Object Model") as proposed by the Microsoft corporation. The benefit of such pages resides in their flexibility of use, and the possibility of presenting data in a format which can be adapted through a simple filtering operation to any type of terminal.

The XML pages delivered by the access stage 410 form the subject of a processing in the multiplexing stage 420, which will be described later, before being sent to the presentation stage 430. The processed XML pages sent to the presentation stage 430 contain tagged data which describe, according to a format independent of the terminals, elements of interaction with the subscribers. Some of these elements of interaction are to be presented dynamically to the subscriber to whom the page is relevant, the mode of presentation being defined in the stage 430 as a function of the type of man/machine interface with which the terminal used is provided (on-screen display of such type or such size, sound signaling, voice messages, etc.) and possibly of subscriber-defined parameters for configuring the man/machine interface.

These elements presented dynamically may represent a subscriber context (for example incoming call, busy terminal, message received, etc.), a context of the information supplied within the framework of a service (for example directory number, content of a message, web page, etc.), a context of the entry fields allowing the subscriber to input information useful to the servers (for example call number, identification of directory record, message to be transmitted, etc.), or a context of the actions which the subscriber can select with the aid of an event programmable in the presentation stage (actuation of a virtual button, voice command, etc.). For this latter type of element, the tagged data of the XML page belong to a dynamic link which points to a page address.

Other interaction elements described in the XML pages sent to the presentation stage 430 may pertain to determined events liable to occur at the terminals and defined in a static manner, i.e. independently of the subscriber contacts and of the dynamic elements presented. These events, defined at the level of the presentation stage 430, comprise for example the actuation by the subscriber of a special button, the expiry of a time-out, etc. The tagged data of the XML page describing this kind of element belong to a static link pointing to a page address.

In the aforesaid links, it is possible to use page addresses similar to URL addresses ("Uniform Resource Locator") commonly used in browsing applications, for example of the form "process_id://page_id", where the field "process_id" designates a process pertaining to an access module 4100-4104, and the field "page_id" designates a page managed by said process. Certain addresses are supplemented with one or more fields for parameters useful for the production of the designated page, the corresponding parameters being suppliable explicitly in the XML page sent to the presentation stage 430 or recoverable from the entry fields described in this XML page.

FIG. 2 shows that the presentation stage 430 comprises an XML browser 433 which analyses the pages received from the multiplexing stage 420 in conjunction with a memory 434 containing the DTD defining the common syntax of the pages. The browser 433 extracts the dynamic elements of each page received for a subscriber, and supplies them to the module 435, 436, 437 for controlling the man/machine interface of the terminal used by the subscriber. Several control modules 435-437 are provided in the stage 430 for catering for the various types of MMI with which the terminals may be equipped. These modules 435-437 manage the appropriate commands for the presentation of the elements required on the terminals, which commands are delivered by way of the interface modules 431, 432 and 440. The control modules 435-437 further monitor the occurrence of the events corresponding to the action links defined in the HML page, and advise the browser 433 of the detection of such an event. In response to the detection of such an event, the browser 433 returns to the multiplexing stage, within the framework of the session in progress with the subscriber concerned, a primitive GET_URL which includes the page address of the corresponding link.

Figure 3:
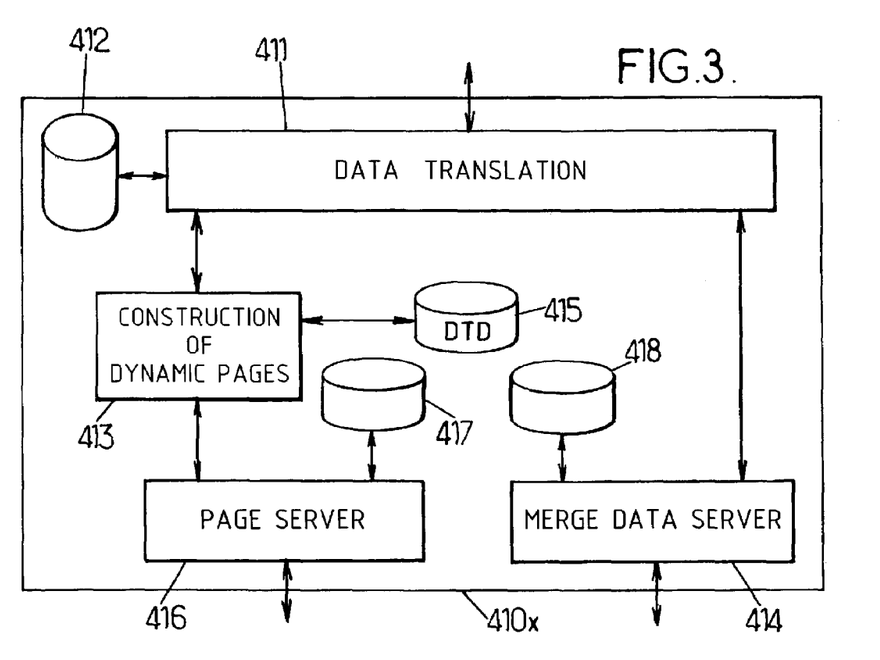
FIG. 3 is a schematic diagram of a module of the access stage of the device.

FIG. 3 diagrammatically shows the components of a module 410x of the service access stage 410 of the proxy server 400. A translation unit 411 carries out the interfacing with the dedicated server 20x corresponding to the relevant access module 410x. The unit 411 manages in particular the entire dialog with the dedicated server, and transcribes the data received from the server into a uniform format corresponding to the pages exchanged within the proxy server 400. To do this, it is furnished with a translation table 412 which allows it to associate, with the data exchanged according to a specific format with the dedicated server, tags common to all the modules of the proxy server 400. Once translated, the data received are sent either to a unit for constructing dynamic pages 413 or to another unit 414 of the module 410x, this other unit being called the merge data server.

The unit for constructing dynamic pages 413 organizes the data tagged within an XML page according to the common structure defined in the DTD 415. The page thus constructed is sent to a unit 416 called the page server which associates it with information identifying the subscriber for which it has been constructed.

Two types of message may trigger the dispatching of an XML page from the access module 410x to the multiplexing stage:

a message originating from the associated server 20x destined for an identified subscriber. In this case, the unit 413 constructs the page to be transmitted from the elements contained in the incoming signaling message, in accordance with the common structure defined in the DTD 415;

a page request received from the multiplexing stage for an identified subscriber. On receipt of a page request, the page server 416 firstly determines whether the page requested is a static page contained in the page library 417. If so, it is not necessary to interrogate the dedicated server: the page server 416 constructs the page on the basis of the static page stored and of any parameters which may have been supplied with the request, then addresses the page thus obtained to the multiplexing stage 420 by indicating the subscriber concerned. Otherwise, the page is constructed by the unit 413 which interrogates the dedicated server 20x through the translation unit 411 when external data are required to construct the page. The unit 413 can also extract, from the page requests and/or from the data of the page in construction, events or parameters which are sent to the translation unit 411 to convey the signaling back up to the dedicated server 20x.

The access module 410x can moreover receive from the multiplexing stage 420 merge requests which are processed by the merge data server 414. A merge request comprises a merge code associated with a merge data type, and possibly associated parameters. The servers 416 and 414 operate in a similar manner, the server 414 manipulating, however, merge data which are not generally organized in the form of pages. On receipt of a merge request, the server 414 firstly determines whether the data requested are static data contained in the library 418. If so, it is not necessary to interrogate the dedicated server: the server 414 fetches the merge data from the library 418, supplements them with any parameters which may have been supplied with the request, then returns them to the multiplexing stage 420 by indicating the subscriber concerned. Otherwise, the merge data server 414 interrogates the dedicated server 20x through the translation unit 411, by indicating any parameters which may be supplied with the request, to obtain the external data required and to return the merge data which result therefrom to the multiplexing stage 420.

The merge codes are present in some of the pages returned by the page servers 416 of the access modules 4100-4104. They are generally accompanied by parameters serving to formulate the merge data. To facilitate their identification in the XML pages, they can comprise a special tag and a function name making it possible to identify a logic port of the access stage 410 for the routing of the corresponding merge request (this name is associated with one of the access modules 4100-4104 and with a logic port of the latter to which the corresponding merge request must be dispatched). Their syntax is for example the following: "%function (para1, . . . , paraN)", where "%" is the characteristic tag of the merge codes "function" is the function name, and para1, . . . , paraN designate the N associated parameters (N≧0). Some of these associated parameters may themselves be merge codes, the brackets making it possible to separate the merge codes nested according to a tree structure.

Figure 4:
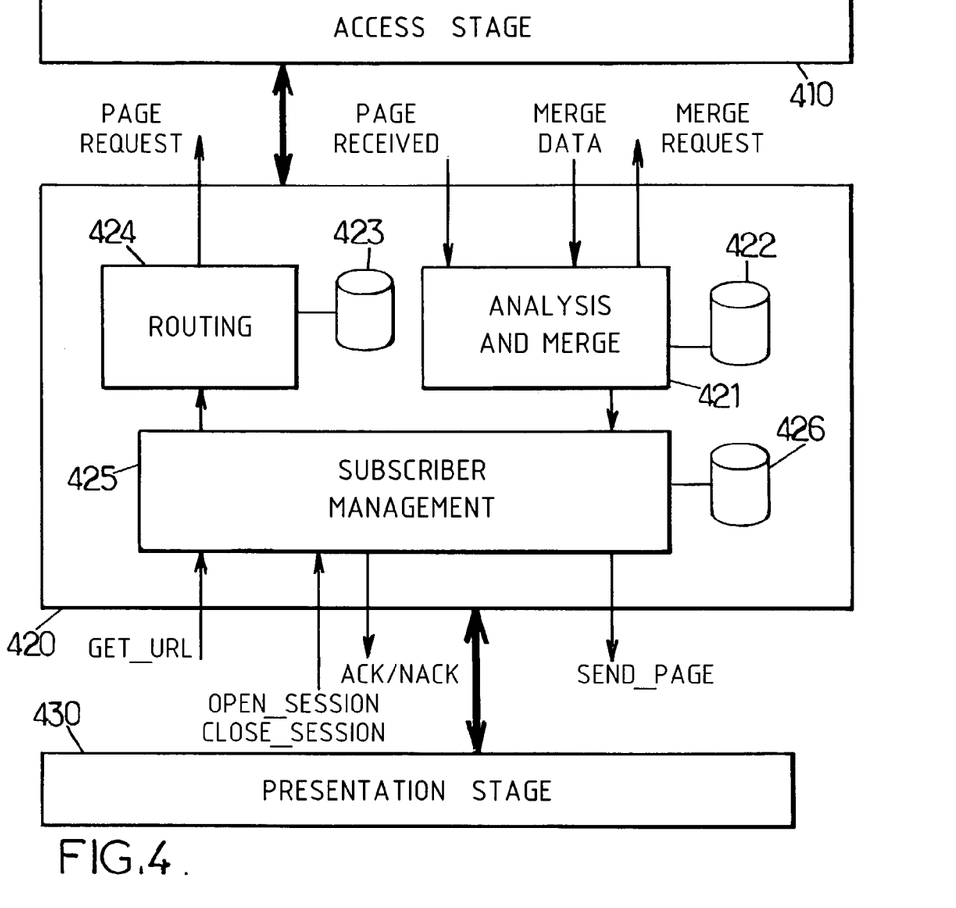
FIG. 4 is a schematic diagram of the multiplexing stage of the device.

FIG. 4 diagrammatically shows the components of the services multiplexing stage 420 of the proxy server 400. Each page received from the access stage 410 is analyzed by an analysis and merge engine 421. The merge operation consists in replacing the merge codes, present in association with any parameters in a page received from an access module 4100-4104, with merge data consisting of tagged data or a link.

This merge operation requires no awareness of the organization of the services in question at the level of the multiplexing stage 420. The merge codes may be flagged without performing any detailed parsing by simply detecting the tags "%" which may be present in the page received. When the analysis engine 421 thus flags a merge code, it interrogates a lookup table 422 on the basis of the function name of the code, thereby enabling it to identify the logic port of the access stage 410 to which the merge request should be routed. The latter can be formulated very simply by copying the merge code with its parameters and by identifying the subscriber concerned. On receipt of the merge data returned for this subscriber by the merge data server 414 of the interrogated access module, the analysis and merge engine 421 substitutes them for the merge code previously located.

The correspondences (merge code function name, logic port of the access stage) are recorded in the table 422 during a procedure for installing the access modules 4100-4104, in which the latter declare to the multiplexing stage 420 the function names of the merge codes processed by their respective merge data serves 414 by indicating the associated logic ports. If a detected merge code does not appear in the lookup table 422, the analysis and merge engine 421 simply deletes this code from the XML page processed.

In the same setup procedure, the access modules 4100-4104 declare to the multiplexing stage 420 the identities "process_id" of the processes taken into account by their respective page servers 416 by indicating the associated logic ports. This allows the multiplexing stage 420 to record the matching of these identities "process_id" with these logic ports in another table 423.

The multiplexing stage 420 comprises a routing module 424 which receives the addresses of pages received from the presentation stage 430 with the primitives GET_URL pursuant to events detected at the level of the terminals. The routing module 424 queries the lookup table 423 on the basis of the identities "process_id" contained in these addresses to determine the logic port of the access stage 410 where the page request is to be routed, and it sends this request accompanied by the corresponding parameters.

Each creation of association of a (physical terminal, subscriber) pair by the presentation stage 430 gives rise to a subscriber session opening request received by a subscriber management module 425 of the multiplexing stage 420 (OPEN_SESSION primitive). This module 425 operates with a subscriber registration table 426 for the subscribers having an open session. The subscriber session opening request contains information indicating among other things a subscriber identifier (for example his telephone call number) and a logic port of the presentation stage for the dispatching of the pages destined for the subscriber. It moreover contains subscriber authentication information, such as for example a password entered by the subscriber. The module 425 interrogates the table 426 to ensure that the subscriber is not already registered there, in which case it returns a negative acknowledgement NACK which is sent to the presentation stage 430. Otherwise, it creates a record in the table 426 including the information contained in the session opening request, then sends back a positive acknowledgement ACK destined for the presentation entity 403. A mechanism for deleting a record is also provided, for example, in the case of a dissolution of a (terminal, subscriber) pair which gives rise to the dispatching by the presentation stage of a subscriber session closure request destined for the module 425 (CLOSE_SESSION primitive).

The receipt of a positive acknowledgement ACK by the presentation stage 430 triggers a default home page request to the multiplexing stage 420. This request can be formulated in the form of the address of the page requested accompanied by parameters corresponding to the subscriber (subscriber number, password) and to the parameters for addressing its terminal on the LAN for the routing of voice and data (network parameters such as IP address, UDP port numbers, etc.), and relayed like the other page addresses by the routing module 424 to the access stage 410.

This default home page may in particular be generated by the access module 4100 associated with the telephony server 200. It may describe a home template offering for example the various services offered by the connected dedicated servers 200-204, and apprising the subscriber of his current telephone context. The information (links) relating to the services available contain in particular page addresses intended to be sent by the access modules 4100-4104 on request from the service. Thus, when the subscriber selects for example the telephony service, the presentation stage 430 sends the page address contained in the selected link to the multiplexing stage 420, within the framework of the session open with the subscriber. Aware of this session, the subscriber management module 425 can inform the routing module 424 so that the page request is sent to the access module 4100 by indicating the identity of the subscriber, the logic port having been obtained in the table 423.

The subscriber management module 425 and the routing module 424 intervene in the same way for the various requests for pages emanating from the presentation stage.

Thus, the processing of these requests by the multiplexing stage 420 requires no awareness of the service relevant to the request. The routing module 424 merely invokes a logic port by passing as arguments the information contained in the address data received from the presentation stage as well as the identification of the subscriber, without analyzing the content of the request or the identity of the service which processes it. Once the request has reached the module 4100-4104 of the access stage 410, it is served as explained hereinabove, this giving rise to the dispatching by this access module of a new XML page accompanied by the subscriber's identification information. This XML page is received by the analysis and merge engine 421 which analyzes it and effects the merges required as the case may be, as indicated previously.

The subscriber's management module 425 also co-operates with the analysis and merge module 421 to route the pages processed within the framework of the sessions open with the various subscribers. The module 425 queries the table 426 to determine from the subscriber identification information accompanying each XML page the logic port corresponding to the session in progress with the subscriber, to which it routes the page processed (SEND_PAGE primitive).

By way of example, an XML page generated by the access module 4101 associated with the directory server 201 can include tagged data such as:

$label/name=DUPONT
$label/firstname=PAUL
$label/phonenumber=78778
$label/mailaddress=DUPONT@MATRANORTEL
%call(78778, MakeCall)
%mail(DUPONT@MATRANORTEL, SendMail).

In this example, the first four lines describe elements to be presented to the subscriber, which are delimited by the tag "$label", namely the name of a subscriber listed in the directory (Dupont), his first name (Paul), his telephone number (78778) and his messaging address (dupont@matranortel). The presentation stage will adopt the mode of display of these elements which is suitable for the terminal used by the subscriber. The last two lines comprise merge codes delimited by the tag "%". The code "%call (78778, MakeCall)" detected by the analysis and merge engine 421 brings about a merge request to the access module 4100 associated with the telephony server, which responds thereto for example by returning the merge data:

<link href="cs_server://1049600?phonenumber=78778"title=$label/MakeCall">, which represent a link between the tagged data item "$label/MakeCall", which will generate the presentation to the subscriber of a call command (virtual button) and the page address "cs_server://1049600" which corresponds to a telephone call page managed by the access module 4100 associated with the telephony server 200, where the call parameter "phonenumber=78778" designates the number called. Likewise, the code "%mail (DUPONT@MATRANORTEL, SendMail)" detected by the analysis and merge engine 421 brings about a merge request to the access module 4102 associated with the messaging server, which responds thereto for example by returning the merge data:

<link href="mail_server://1249600?mailaddress=DUPONT@MATRANORTEL" title=$label/SendMail">, which represent a link between the tagged data item "$label/SendMail", which will generate the presentation to the subscriber of a message dispatch command (virtual button) and the page address "mail_server://1249600" which corresponds to a message dispatch page managed by the access module 4102 associated with the messaging server 202, where the parameter "mailaddress=DUPONT@MATRANORTEL" designates the dispatch address for the message.

Figure 5:
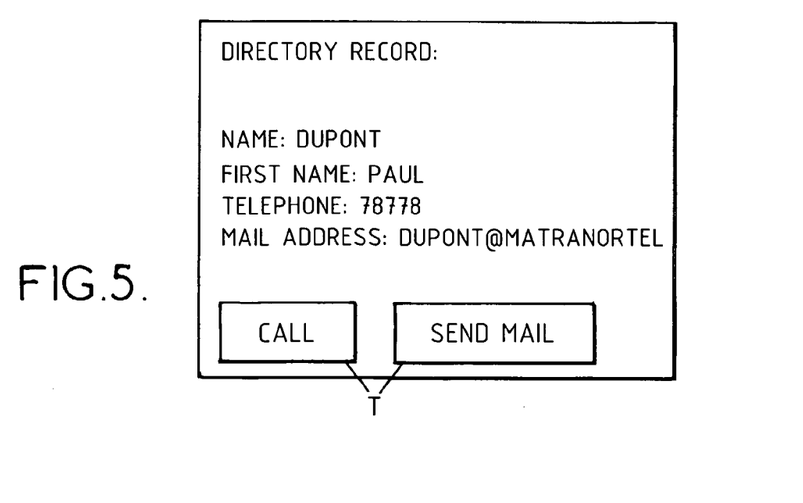
FIG. 5 shows an exemplary template displayable on a terminal connected to the network.

FIG. 5 is an illustration of an exemplary display generated on the screen of a terminal pursuant to the production of the previous page, processed by the analysis and merge engine 421. The activation by the subscriber of one of the virtual buttons T will then trigger the conveying of the page address "cs_server://1049600" or "mail_server://1249600" back up from the presentation stage 430 to the multiplexing stage 420, then a page request to the access module 4100 or 4102 to initialize the establishment of the requested call or the dispatching of the message.

The merge operation can involve several successive merge requests when nested merge codes are present in the page. In this case, the hierarchy of the brackets allows the analysis engine 421 to separate the merge codes and to begin by generating the merge requests for the inner codes, the intermediate merge data then consisting of parameters which the analysis and merge engine 421 substitutes for the corresponding merge codes.

By way of example, an XML page generated by the access stage 410 can include the following merge code:

%call(%last_outgoing_call, Bis).

In this example, the merge code "%last_outgoing_call", processed first, corresponds to a logic port of the merge data server 414 of the access module 4104 associated with the logging server. On receipt of the merge request addressed to this logic port, the access module 4104 interrogates the logging server 204 to fetch the last telephone number called by the subscriber, and this number is returned to the multiplexing stage by way of merge data, for example "78722". The merge code "%call (78722, Bis)" resulting from this first step is then processed in turn by means of a merge request to the access module 4100 which returns, in the same way as in the previous example, the tagged data:

<link href="cs_server://1049600?phonenumber=78722"title=%label/Bis">, making it possible to present the subscriber with a virtual button corresponding to the function for repeating the last call (bis button).

It may be seen that the engine 421 allows the multiplexing stage 420 to merge objects corresponding to different services without having a priori awareness of the services concerned. Thus, a page received from the stage 410 originating from a first access module and containing an action corresponding to a service whose processing takes place within a second access module is processed by the multiplexing stage 420 in such a way that it no longer contains any merge codes, but links and/or tagged data describing elements to be presented, and that it can be utilized by the presentation stage 430 without there being any need to establish dialog between the various servers 200-204 or access modules 4100-4104.

Neither does the incorporation of the merge codes into the XML pages delivered by the access stage imply that an access module is aware of the structure of the services offered by the dedicated servers with which it is not associated. In the first example above, to insert the codes "%call (78778, MakeCall)" and "%mail (DUPONT@MATRANORTEL, SendMail)", the page server 416 of the access module 4101 associated with the directory server 201 simply needs to known that "78778" is a callable telephone number and "DUPONT@MATRANORTEL" a messaging address (this forming part of the directory job), without being aware of how the servers 200 and 202 process the telephone calls and the dispatching of the messages.

The invention claimed is:

1. A device for supervising terminals connected to a communication network for supplying subscribers using the terminals with various services managed by a plurality of dedicated servers, the device comprising means of interfacing with the network, a stage for presenting services to the terminals through said interfacing means, a service multiplexing stage communicating with the presentation stage, and a service access stage communicating with the multiplexing stage and comprising a plurality of access modules each associated with a respective dedicated server, wherein each access module is arranged to deliver tagged data pages to the multiplexing stage in response to incoming messages from the associated dedicated server and/or to page requests from the multiplexing stage, and to deliver merge data to the multiplexing stage in response to merge requests, each delivered page being associated with a subscriber with which the multiplexing stage has a communication session in progress through the presentation stage, some at least of the delivered pages to the multiplexing stage containing merge codes pertaining to services, wherein the multiplexing stage comprises means for processing each page received from the access stage to detect the merge codes, address a merge request to the access module associated with the dedicated server managing the service to which each detected merge code pertains, substitute the merge data delivered by said access module in response to the merge request for a field of the page including the detected merge code, and supply the processed page to the presentation stage within a framework of the session in progress with the associated subscriber, each page supplied to the presentation stage containing tagged data describing, according to a format independent of the terminals, elements of interaction with the associated subscriber, wherein the presentation stage comprises terminal control means for interpreting each page received from the multiplexing stage within the framework of the session in progress with the subscriber using one of the terminals to generate commands to the presentation on the terminal of interaction elements described by the tagged data of the page, and wherein the multiplexing stage further comprises routing means for receiving page addresses from the presentation stage within the framework of the session in progress with the subscriber, identifying the access module for which the page address received is intended and transmitting a corresponding page request to the identified access module.

2. The device as claimed in claim 1, wherein the tagged data contained in some at least of the pages supplied to the presentation stage describe, in addition to the elements of interaction with the associated subscriber, at least one link between one of said interaction elements and a page address, and wherein the terminal control means of the presentation stage are arranged to associate each link of a page received from the multiplexing stage within the framework of the session in progress with the subscriber using one of the terminals with an event which may occur at the terminal, and to return the page address of said link to the multiplexing stage within the framework of said session in response to an occurrence of said event.

3. The device as claimed in claim 2, wherein the links described in the tagged data contained in the pages supplied to the presentation stage comprise static links which the control means associate with predetermined events which can occur at the terminals and dynamic links associated with elements presented dynamically at the terminals.

4. The device as claimed in claim 2, further comprising means for generating a home page on completion of an opening of session between the multiplexing stage and the subscriber using one of the terminals, the home page being processed by the presentation stage and contains links with page addresses intended for various modules of the access stage.

5. The device as claimed in claim 4, wherein the home page generation means are included in one of the access modules.

6. The device as claimed in claim 1, wherein said tagged data pages are XML pages established according to a format common to the whole device.

7. The device as claimed in claim 1, wherein the multiplexing stage comprises subscriber management means co-operating with a memory where data pertaining to the subscribers is stored.

8. The device as claimed in claim 7, wherein the data pertaining to the subscriber which are stored in said memory comprise a subscriber identifier and authentication parameters, which the subscriber management means compare with parameters supplied by the subscriber upon an opening of session with said subscriber.

9. The device as claimed in claim 1, wherein the routing means of the multiplexing stage co-operate with a memory containing a lookup table for matching portions of the page addresses received from the presentation stage with respective logic ports of the access stage associated with the access modules to which the corresponding page requests are to be sent.

10. The devipe as claimed in claim 1, wherein the processing means of the multiplexing stage co-operate with a memory containing a lookup table for matching portions of the merge codes with respective logic ports of the access stage associated with the access modules to which the corresponding merge requests are to be sent.

11. The device as claimed in claim 1, wherein at least one of the access modules comprises a library of static pages from which are extracted at least in part tagged data pages delivered to the multiplexing stage in response to page requests, without exchange with the associated dedicated server.

* * * * *